United States Patent
Furukawa

(10) Patent No.: US 10,978,222 B2
(45) Date of Patent: Apr. 13, 2021

(54) INSULATED ELECTRIC WIRE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Toyoki Furukawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/618,995

(22) PCT Filed: Jul. 13, 2018

(86) PCT No.: PCT/JP2018/026424
§ 371 (c)(1),
(2) Date: Dec. 3, 2019

(87) PCT Pub. No.: WO2019/021850
PCT Pub. Date: Jan. 31, 2019

(65) Prior Publication Data
US 2020/0381141 A1    Dec. 3, 2020

(30) Foreign Application Priority Data
Jul. 26, 2017   (JP) .............................. JP2017-144606

(51) Int. Cl.
*H01B 7/285*   (2006.01)
*H01B 7/02*    (2006.01)

(52) U.S. Cl.
CPC ............... *H01B 7/285* (2013.01); *H01B 7/02* (2013.01)

(58) Field of Classification Search
CPC ........... H01B 7/282; H01B 7/285; H01B 7/02
See application file for complete search history.

(56) References Cited

U.S. PATENT DOCUMENTS

| 4,461,736 A | 7/1984 | Takagi |
| 5,536,904 A * | 7/1996 | Kojima ................. H01B 7/285 156/48 |

(Continued)

FOREIGN PATENT DOCUMENTS

| CN | 103907161 A | 7/2014 |
| DE | 10 2011 083 952 A1 | 4/2013 |

(Continued)

OTHER PUBLICATIONS

Feb. 19, 2019 Office Action issued in Japanese Patent Application No. 2017-144606.

(Continued)

*Primary Examiner* — Timothy J Thompson
*Assistant Examiner* — Amol H Patel
(74) *Attorney, Agent, or Firm* — Oliff PLC

(57) ABSTRACT

An insulated electric wire having a water-stopped portion that is simple in configuration and can be formed by simple processes, including a conductor containing a plurality of twisted elemental wires made of conductive material, and an insulation covering covering an outer surface of the conductor. The wire contains an exposed portion wherein the covering is removed from the outer surface of the conductor, and a covered portion wherein the covering covers the outer surface of the conductor, with the exposed and covered portions arranged adjacently along a longitudinal axis of the insulated electric wire, where a density of the conductive (Continued)

material per unit length is higher in the exposed portion than in a remote area of the covered portion that is an area excluding an area adjacent to the exposed portion, and a sealant made of an insulated material fills gaps between the elemental wires of the exposed portion.

16 Claims, 3 Drawing Sheets

(56) References Cited

U.S. PATENT DOCUMENTS

| | | | |
|---|---|---|---|
| 5,846,467 A | 12/1998 | Saito et al. | |
| 2010/0032185 A1* | 2/2010 | Hashimoto | H01B 7/285 174/120 R |
| 2010/0212936 A1 | 8/2010 | Arai | |
| 2010/0307815 A1 | 12/2010 | Gehrke et al. | |
| 2011/0048762 A1 | 3/2011 | Sawamura | |
| 2012/0061122 A1* | 3/2012 | Kodama | H01B 1/026 174/126.1 |
| 2014/0299353 A1* | 10/2014 | Saito | H01B 7/285 174/113 R |
| 2016/0329129 A1* | 11/2016 | Osborne, Jr. | H01B 7/295 |
| 2018/0097344 A1* | 4/2018 | Daga | B60R 16/0215 |

FOREIGN PATENT DOCUMENTS

| | | |
|---|---|---|
| JP | 2000-011771 A | 1/2000 |
| JP | 2007-141569 A | 6/2007 |
| JP | 2009-135073 A | 6/2009 |
| JP | 2013-097922 A | 5/2013 |
| JP | 2014-519137 A | 8/2014 |
| JP | 2019-29093 A | 2/2019 |

OTHER PUBLICATIONS

Sep. 25, 2018 International Search Report issued in International Patent Application No. PCT/JP2018/026424.
Mar. 12, 2020 Office Action issued in Indian Patent Application No. 201917049698.
Aug. 4, 2020 Office Action issued in Japanese Patent Application No. 2017-144607.
Aug. 20, 2020 Office Action issued in U.S. Appl. No. 16/628,732.
Aug. 31, 2020 Office Action issued in Indian Patent Application No. 202017005674.
May 12, 2020 Office Action issued in Chinese Patent Application No. 201880045942.8.
Sep. 25, 2018 International Search Report issued in International Patent Application No. PCT/JP2018/026425.
Sep. 2, 2020 Office Action issued in Chinese Patent Application No. 201880045938.1.
Nov. 16, 2020 Office Action issued in German Patent Application No. 11 2018 003 812.2.

* cited by examiner

INSULATED ELECTRIC WIRE

TECHNICAL FIELD

The present invention relates to an insulated electric wire, and more specifically to an insulated electric wire having a portion where an insulation covering is removed and water-stopping treatment is applied using a sealant.

BACKGROUND ART

In some cases, water-stopping treatment is partially applied to an insulated electric wire in the longitudinal axis of the wire. Conventionally, in these cases, an insulation covering 93 is removed from an insulated electric wire 91 at a position where a water-stopped portion 94 is to be formed to expose a conductor 92. Then, a sealant (i.e., water-stopping agent) 95 is permeated between elemental wires constituting the conductor 92, as shown in FIG. 4. A method for making the sealant 95 permeate between elemental wires is, for instance, disclosed in Patent Document 1.

Further, a protective member 99 such as a shrinkable tube is often placed around the water-stopped portion 94 where the sealant 95 is introduced between the elemental wires. In such cases, the protective material 99 plays a roll of physically protecting the water-stopped portion 94, and also a roll of stopping water from between the conductor 92 and the insulation covering 93 adjacent to the portion where the conductor 92 is exposed.

CITATION LIST

Patent Literature

Patent Document 1: JP 2007-141569 A

SUMMARY OF INVENTION

Technical Problem

When the water-stopping treatment is applied as described above, the sealant needs to fully permeate between elemental wires constituting the conductor. To this end, a low-viscosity sealant needs to be used. Thus, the type of available sealants is limited.

Degree of permeation of a sealant between the elemental wires tends to vary depending on the portions and electric wires to which the sealant is applied, whereby reliability of a water-stopping performance is lowered. In Patent Document 1, with the aim of achieving thorough permeation of a sealant even into small gaps between elemental wires, a part of an electric wire is accommodated in a pressure chamber. While a gas is introduced into the pressure chamber and released outside of the pressure chamber passing inside an insulation covering of the coated electric wire, the sealant made of a hot-melt material is forced to permeate between the electric wires. If such special method is used, the process of the water-stopping treatment will be complicated even though a sealant thoroughly permeates between the elemental wires.

Further, when a low-viscosity sealant is used, a difficulty arises in making the sealant stay on the outer surface of the conductor without dripping or flowing. Thus, in order to provide an insulation layer on the outer surface of the conductor at a water-stopped portion, a protective member such as the above-described shrinkable tube needs to be disposed as a separate member. Thus, the configuration of a water-stopped portion and the process of a water-stopping treatment will be complicated.

An object of the present invention is to provide an insulated electric wire with a water-stopped portion that is simple in configuration and can be formed by simple processes.

Solution to Problem

In order to solve the foregoing problem, an insulated electric wire according to a first embodiment of the present invention contains a conductor contains a plurality of twisted elemental wires made of a conductive material, and an insulation covering that covers an outer surface of the conductor. The insulated electric wire further contains an exposed portion in which the insulation covering is removed from the outer surface of the conductor and a covered portion in which the insulation covering covers the outer surface of the conductor, the exposed portion and the covered portion placed adjacent with each other along a longitudinal axis of the insulated electric wire, where a density of the conductive material per unit length is higher in the exposed portion at least than in a remote area of the covered portion that is an area excluding an area adjacent to the exposed portion of the covered portion, and gaps between the elemental wires of the exposed portion are filled with a sealant made of an insulated material.

It is preferable that in the exposed portion, the sealant further covers the outer surface of the conductor, and the portion of the sealant covering the outer surface of the conductor and the portion of the sealant filling the gaps between the elemental wires are continuous. It is preferable that the sealant further covers the outer surface of the insulation covering at an end portion of the covered portion adjacent with the exposed portion, and the portion of the sealant covering the outer surface of the insulation covering at the end portion of the covered portion adjacent with the exposed portion, and the portion of the sealant covering the outer surface of the conductor in the exposed portion are continuous.

It is preferable that the density of the conductive material per unit length in the exposed portion is 1.01 times of the density of the conductive material per unit length in the remote area or higher. It is preferable that the density of the conductive material per unit length in the exposed portion is 1.50 times of the density of the conductive material per unit length in the remote area or lower. It is preferable that the elemental wires have a smaller twist pitch in the exposed portion than in the remote area.

It is preferable that the exposed portion is placed at a middle portion along the longitudinal axis of the insulated electric wire, and the density of the conductive material per unit length is higher in the exposed portion than in the remote areas of the covered portion that is an area excepting an area adjacent to the exposed portion of the covered portion.

An insulated electric wire according to a second embodiment of the present invention contains a conductor containing a plurality of twisted elemental wires made of a conductive material, and an insulation covering that covers an outer surface of the conductor. The insulated electric wire further contains an exposed portion in which the insulation covering is removed from the outer surface of the conductor, and a covered portion in which the insulation covering covers the outer surface of the conductor, the exposed portion and the covered portion placed adjacent with each other along a longitudinal axis of the insulated electric wire, where in the exposed portion, gaps between the elemental wires of the exposed portion filled are with a sealant made of an insulated material, and the sealant further covers the outer surface of the conductor, with the portion of the sealant covering the outer surface of the conductor and the portion of the sealant filling the gaps between the elemental wires are continuous.

It is preferable that the sealant further covers the outer surface of the insulation covering at an end portion of the covered portion adjacent with the exposed portion, and the portion of the sealant covering the outer surface of the insulation covering at the end portion of the covered portion adjacent with the exposed portion, and the portion of the sealant covering the outer surface of the conductor in the exposed portion are continuous.

It is preferable that the sealant contains a curable resin composition.

Advantageous Effects of the Invention

In the above-described insulated electric wire according to the first embodiment of the present invention, the density of the conductive material per unit length is higher in the exposed portion than in the remote area of the covered portion. Thus, sufficiently large gaps can be formed in the exposed portion between the elemental wires to be filled with the sealant. As a result, the sealant smoothly fills the gaps between the elemental wires of the exposed portion with high uniformity even without any special operation performed to enhance permeation of the sealant. Thus, the insulated electric wire is formed to have a water-stopped portion exhibiting an excellent water-stopping performance between the elemental wires. Thus, the water-stopped portion that is simple in configuration can be provided to the insulated electric wire by simple processes. Especially, even when a relatively high viscous sealant is used, the sealant smoothly permeates between the gaps between the elemental wires. The relatively high viscous sealant stays on the outer surface of the conductor due to its viscosity to dispose the insulated material on the outer surface of the conductor. Thus, it will not be necessary to dispose an insulated material as a separate member such as a shrinkable tube.

When, in the exposed portion, the sealant further covers the outer surface of the conductor, and the portion of the sealant covering the outer surface of the conductor and the portion of the sealant filling the gaps between the elemental wires are continuous, the sealant covering the outer surface of the conductor can play a role as a protective member for physically protecting the water-stopped portion.

In this case, when the sealant further covers the outer surface of the insulation covering at an end portion of the covered portion adjacent with the exposed portion, and the portion of the sealant covering the outer surface of the insulation covering at the end portion of the covered portion adjacent with the exposed portion, and the portion of the sealant covering the outer surface of the conductor in the exposed portion are continuous, the sealant also stops water from between the insulation covering of the covered portion and the conductor of the covered portion.

When the density of the conductive material per unit length in the exposed portion is 1.01 times of the density of the conductive material per unit length in the remote area or higher, sufficiently large gaps can be formed between the elemental wires to be filled with the sealant. Thus, the sealant easily permeates into the spacing between the elemental wires, whereby an insulated electric wire exhibiting an excellent water-stopping performance can be produced easily.

When the density of the conductive material per unit length in the exposed portion is 1.50 times of the density of the conductive material per unit length in the remote area or lower, the water-stopping performance of the insulated electric wire is improved without excessively increasing the density of the conductive material per unit length in the exposed portion.

When the elemental wires have a smaller twist pitch in the exposed portion than in the remote area, the sealant disposed in the gaps between the elemental wires of the exposed portion effectively stays in the gaps during the water-stopping treatment. Thus, an insulated electric wire having an excellent water-stopping performance can be produced easily.

When the exposed portion is placed at a middle portion along the longitudinal axis of the insulated electric wire, and the density of the conductive material per unit length is higher in the exposed portion than in the remote areas of the covered portion that is an area excepting an area adjacent to the exposed portion of the covered portion, the density of the conductive material per unit length in the exposed portion is easily increased than in the case where the exposed portion is placed at an end portion of the insulated electric wire, whereby an insulated electric wire having an excellent water-stopping performance can be obtained easily through uniform filling of the sealant.

In the above-described insulated electric wire according to the second embodiment of the present invention, in the exposed portion, the common sealant is disposed in the gaps between the elemental wires and on the outer surface of the conductor in a continuous manner. Thus, the water-stopping between the elemental wires and coating of the outer surface of the conductor can be performed using the same sealant, whereby the water-stopped portion that is simple in configuration can be provided to the insulated electric wire by simple processes.

When the sealant further covers the outer surface of the insulation covering at the end portion of the covered portion adjacent with the exposed portion, and the portion of the sealant covering the outer surface of the insulation covering at the end portion of the covered portion adjacent with the exposed portion, and the portion of the sealant covering the outer surface of the conductor in the exposed portion are continuous, the sealant stops water from between the insulation covering and the conductor at the covered portion.

When the sealant contains the curable resin composition in the insulated electric wires according to the first and second embodiments of the present invention, by placing the sealant in the gaps between the elemental wires in the exposed portion, on the outer surface of the conductor in the exposed portion, and on the outer surface of the insulation covering, an excellent water-stopping performance and a protection performance can be achieved in such areas.

DESCRIPTION OF EMBODIMENTS

A detailed description of an insulated electric wire according to a preferred embodiment of the present invention will now be provided with reference to the attached drawings.

[Insulated Electric Wire According to First Embodiment]

Figure 1:
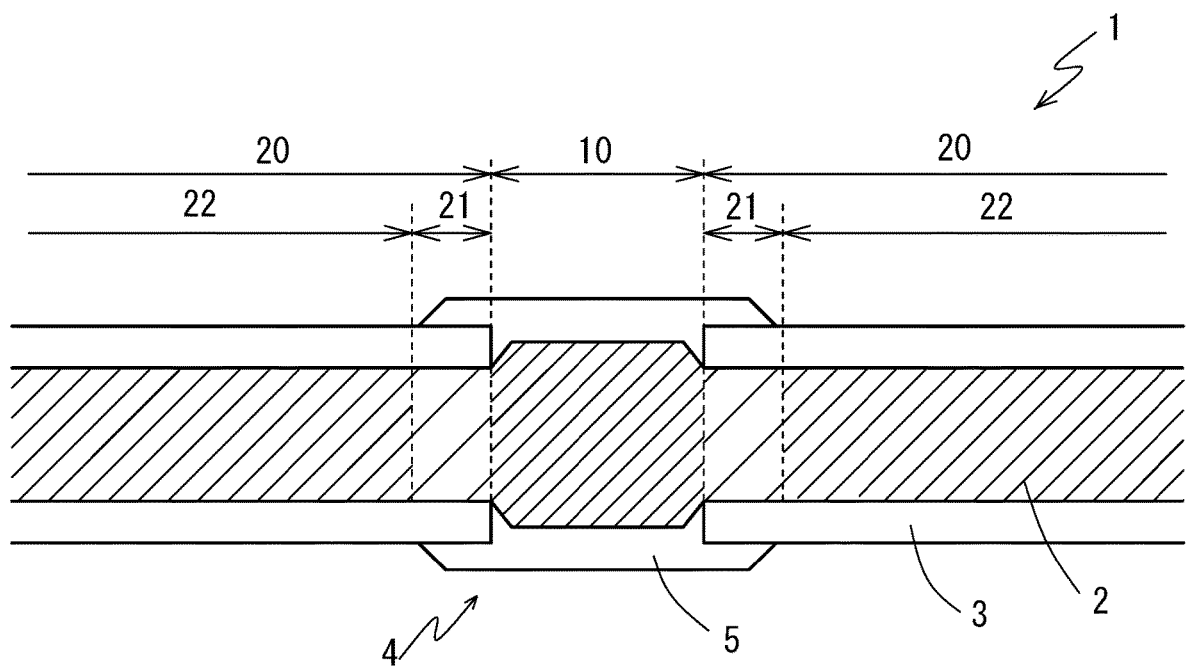
FIG. 1 is a schematic cross-sectional view of an insulated electric wire according to a preferred embodiment of the present invention.
Figure 2:
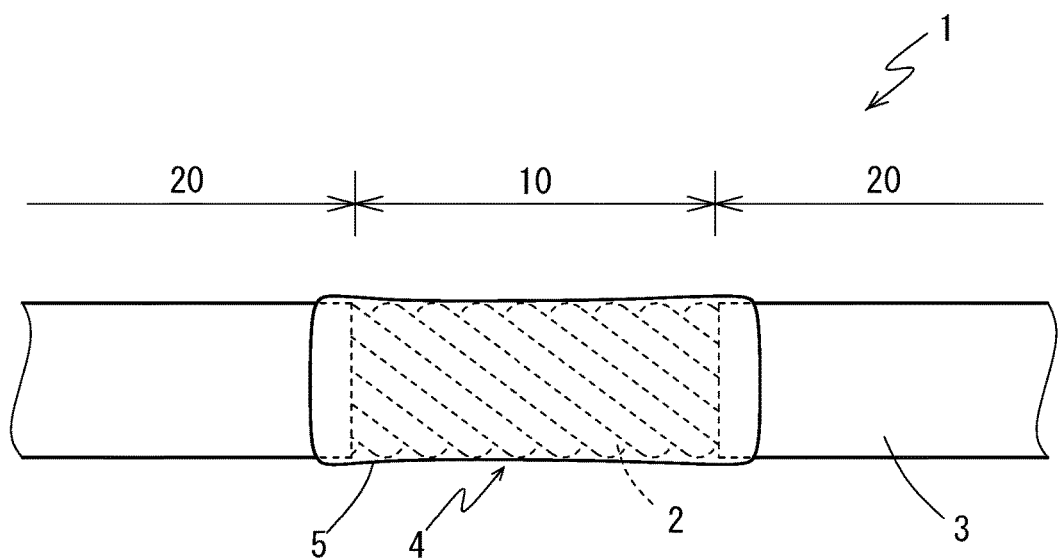
FIG. 2 is a perspective side view illustrating the insulated electric wire.
Figure 3:
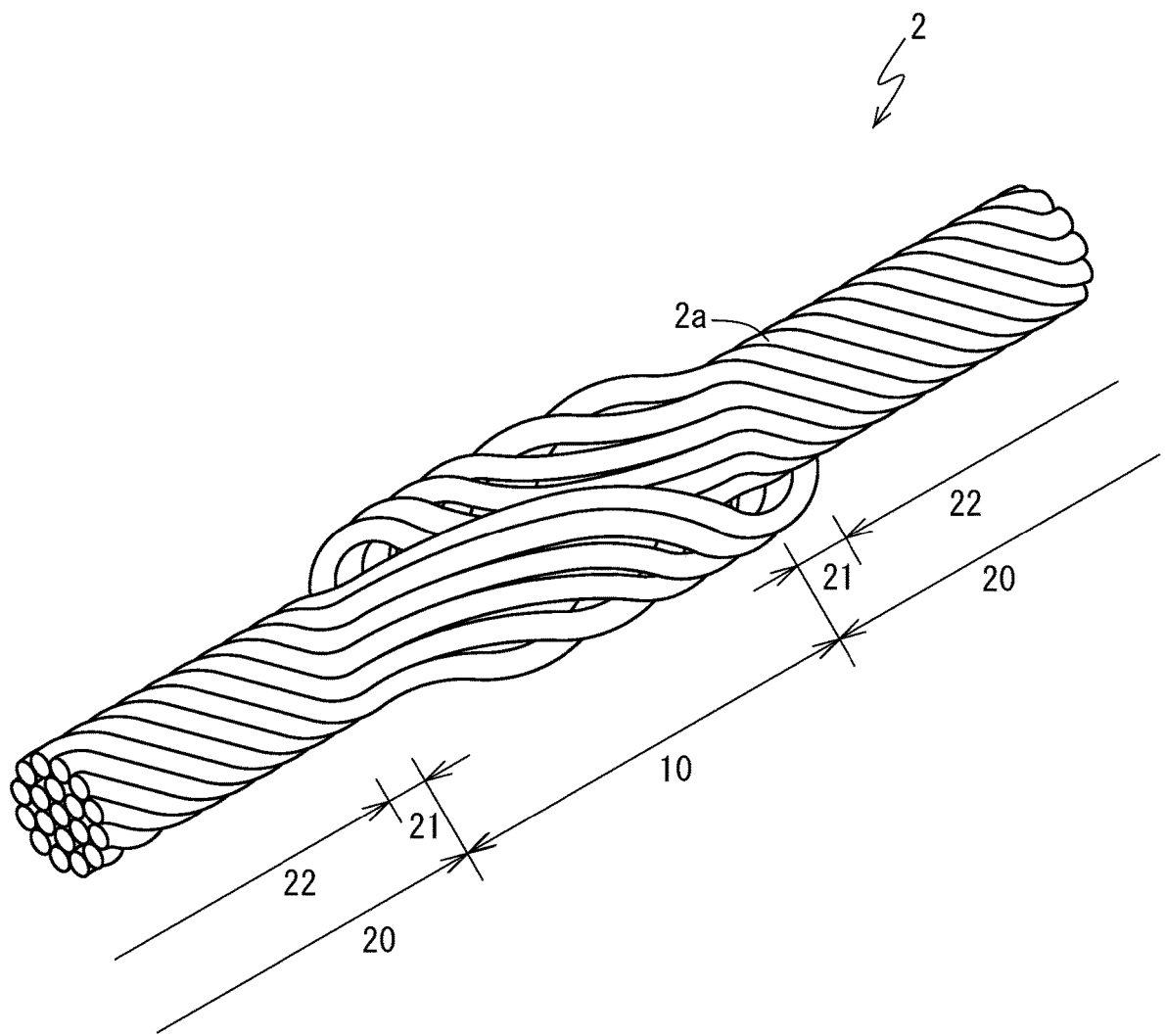
FIG. 3 is a perspective view schematically illustrating a conductor constituting the insulated electric wire.

FIGS. 1 to 3 illustrate overview of an insulated electric wire 1 according to the first embodiment of the present invention and a conductor 2 constituting the insulated electric wire 1.

(Overview of Insulated Electric Wire)

The insulated electric wire 1 contains the conductor 2 and an insulation covering 3 covering the conductor 2. The conductor 2 contains a plurality of elemental wires 2a made of a conductive material. The plurality of elemental wires 2a are twisted together. A water-stopped portion 4 is formed in the middle portion of the insulated electric wire 1 along the longitudinal axis of the wire 1.

The elemental wire 2a constituting the conductor 2 may be made of any kind of conductive material. However, copper is generally used as a material of the conductor of the insulated electric wire. In addition to the copper, metal materials such as aluminum, magnesium and iron may be used. The metal material may be an alloy. Examples of other metals to be used to form an alloy include iron, nickel, magnesium, silicon, and combination thereof. All elemental wires 2a may be made of a same kind of metal, or elemental wires 2a made of multiple types of metals may be combined together.

In view of easiness in increasing spacing between the elemental wires 2a in an exposed portion 10 in the process of forming the water-stopped portion 4, it is preferred that the twist structure of the elemental wires 2a of the conductor 2 is simple although not particularly limited. For example, a twist structure in which the elemental wires 2a are collectively twisted all together is preferred rather than a master-slave twist structure in which a plurality of strands each containing a plurality of twisted elemental wires 2a are gathered and further twisted. Further, the whole diameter of the conductor 2 and the diameter of each elemental wire 2a are not particularly limited; however, as the diameters of the whole conductor 2 and each elemental wire 2a are smaller, the effect and significance of filling minute gaps between the elemental wires 2a in the water-stopped portion 4 with a sealant to improve reliability of water stopping becomes higher. Accordingly, it is preferable that a cross section of the conductor is about 8 mm$^2$ or smaller while a diameter of the elemental wire is about 0.45 mm or smaller.

A material constituting the insulation covering 3 is not particularly limited as long as it is an insulating polymer material. Examples of such material include a polyvinyl chloride resin (PVC) and an olefin-based resin. In addition to the polymer material, a filler or an additive may be contained in the covering 3 as appropriate. Further, the polymer material may be cross-linked.

The water-stopped portion 4 involves an exposed portion 10 at which the insulation covering 3 is removed from the outer surface of the conductor 2. In the exposed portion 10, gaps between the elemental wires 2a constituting the conductor 2 are filled with a sealant 5.

It is preferable that in the exposed portion 10, the sealant 5 continuously covers the outer surface of the conductor 2 with the gaps between the elemental wires 2a. Further, it is preferable that the sealant 5 further continuously covers the outer surfaces of the insulation covering 3 at end portions of the covered portions 20 adjacent with the exposed portion 10, with an area in the outer surface of the conductor 3 covered by the sealant 5 in the exposed portion 10, that is the outer surface of an end portion of an area in the insulation covering 3 wherein the insulation covering 3 stays on the outer surface of the conductor 2. In this case, the sealant 5 covers the outer surface, preferably the entire outer surface of an area extending from the end portion of the covered portion 20 located on one side of the exposed portion 10 to the end portion of the covered portion 20 located on the other side of the exposed portion 10 continuously. Further, the sealant 5 fills the areas between the elemental wires 2a of the exposed portion 10 continuously with covering the outer surfaces portion.

A material contained in the sealant 5 is not particularly limited as long as it is an insulating material that hardly passes a fluid such as water, and exhibits a water-stopping performance; however, it is preferable that the sealant 5 contains an insulating resin composition, and particularly in view of easily filling gaps between the elemental wires 2a with keeping high fluidity, the sealant 5 preferably contains a thermoplastic resin composition or a curable resin composition. By placing such resin composition between the elemental wires 2a and on the outer peripheries of the exposed portion 10 and the end portions of the covered portion 20 (i.e., on outer peripheral areas), and then lowering the fluidity of the composition, the water-stopped portion 4 with a high water-stopping performance can be stably formed. The curable resin is especially preferred to be used as the sealant 5. It is preferable that the curable resin exhibits at least one or more types of curability such as thermal curability, photocurability, moisture curability, and two-component reaction curability.

The type of a resin contained in the sealant 5 is not particularly limited. Examples of the resin include silicone resins, acrylic resins, epoxy resins, and urethane resins. To the resin material, various kinds of additives can be added appropriately as long as characteristics of the resin material as a sealant are not deteriorated. In view of simplicity of the configuration, it is preferable that only one type of the sealant 5 is used; however, two types of the sealants 5 may be mixed or stacked if necessary.

It is preferable that the sealant 5 is a resin composition having a viscosity of 4000 mPa·s or higher, more preferably 5000 mPa·s or higher, still more preferably 10,000 mPa·s or higher upon filling. Due to this, when the sealant 5 placed at the areas between the elemental wires 2a and on the outer peripheral areas, and especially on the outer peripheral areas, the sealant 5 hardly drops or flows and is likely to stay at the areas with high uniformity. On the other hand, it is preferable that the viscosity of the sealant 5 upon filing is suppressed to 200,000 mPa·s or lower since too high fluidity may suppress sufficient permeation of the sealant 5 into the areas between the elemental wires 2a.

As described above, when the gaps between the elemental wires 2a of the exposed portion 10 are filled with the sealant 5, water stopping is achieved in the areas between the elemental wires 2a, preventing a fluid such as water from entering the area. Further, by covering the outer peripheral portion of the conductor 2 at the exposed portion 10, the sealant 5 plays a role of physically protecting the exposed portion 10. Further, by also integrally covering the outer surface of the end portions of the covered portions 20 adjacent to the exposed portion 10, the sealant 5 plays a role of stopping water between the insulation covering 3 and the conductor 2. In other words, the sealant 5 also plays a role of preventing fluid such as water from entering the spacing between the insulation covering 3 and the conductor 2 from outside.

Figure 4:
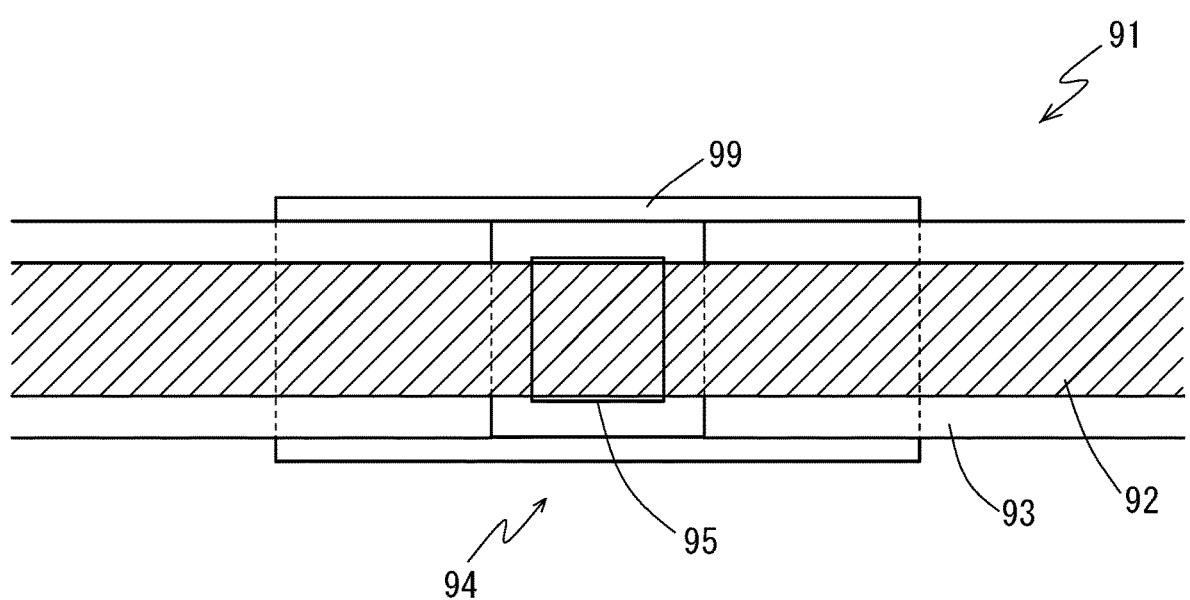
FIG. 4 is a cross-sectional view illustrating a water-stopped portion of a conventional insulated electric wire.

As shown in FIG. 4, in a water-stopped portion 94 of a conventional insulated electric wire 91, a separate protective material 99 such as a shrinkable tube is provided to an outer surface of the portion filled with a sealant 95, for physically protecting the water-stopped portion 94 and stopping water between an insulation covering 93 and a conductor 92. However, as described above, by placing the common sealant 5 in the outer peripheral areas in addition to the area between the elemental wires 2a, the sealant 5 plays both rolls as a water-protection material between the elemental wires, and as a protective member, eliminating the necessity to provide a protective material to the outer surface of the water-stopped portion as a separate member. Accordingly, the configuration and production process of the water-stopped portion 4 is simplified, and the cost for installing the separate protective member can be eliminated. Further, increase of the diameter of an insulated electric wire 1 caused by placing the protective member, and further increase of the entire diameter of a wiring harness containing the insulated electric wire 1 are prevented. In the present embodiment, however, a protective member may be provided on the outer surface of the sealant 5 as a separate member. Including such cases, the sealant 5 may be disposed only in the gaps between the elemental wires 2a without covering the outer peripheral area.

In the present embodiment, the water-stopped portion 4 is provided at a middle portion of the insulated electric wire 1 in the longitudinal axis of the wire 1 from the viewpoints of the scale of demands and easiness in increasing spacing between the elemental wires 2a. However, a similar water-stopped portion 4 can be provided to the end portion of the insulated electric wire 1 in the longitudinal axis of the wire 1. In this case, the end portion of the insulated electric wire 1 may be connected to another member such as a terminal fitting or left unconnected. The water-stopped portion 4 covered with the sealant 5 may contain another member such as a connecting member in addition to the conductor 2 and the insulation covering 3. Examples of the case where the water-stopped portion 4 contains another member include a case where the water-stopped portion 4 is provided to a splice portion where a plurality of the insulated electric wires 1 are connected.

(State of Conductor in Water-Stopped Portion)

In the conductor 2 of the insulated electric wire 1 according to the present embodiment, the density of the conductive material per unit length (per unit length of the insulated electric wire 1 in the longitudinal axis) is not uniform and has nonuniform distribution. Each of the elemental wires 2a is a wire having a substantially uniform diameter continuously along the entire longitudinal axis of the insulated electric wire 1. In the present specification, a state where the density of the conductive material per unit length is different between areas is defined as a state where the diameter and the number of the elemental wires 2a are constant, but the state of assembly of the elemental wires 2a such as the state of twist of the elemental wires 2a is different.

Specifically, the density of the conductive material per unit length of the conductor 2 is higher in the exposed portion 10 than in the covered portion 20. However, the coated portions 20 may have areas (i.e., adjacent areas) in which the density of the conductor material per unit length may be locally lower. In the conductor 2 according to the present embodiment, the density of the conductive material per unit length in the exposed portion 10 is represented based on comparison with the remote 22 area, excluding the adjacent area 21. Thus, the density of the conductive material per unit length is higher in the exposed portion 10 than in the remote area 22 of the covered portion 20. In the remote area 22, the state of the conductor 22 including the density of the conductive material per unit length is substantially the same as the state in the insulated electric wire 1 that does not have the water-stopped portion 4.

The reason why the density of the conductor material per unit length is lowered in the adjacent area 21 is for example, due to shift of the conductive material from the adjacent area 21 to the exposed portion 10, deformation of the conductor 2 for ensuring continuity between the exposed portion 10 and the covered portion 20, etc. The remote areas 22 can be set appropriately sufficiently avoiding the adjacent area 21, if a spacing of the same length as the exposed portion 10 or longer kept between each end portion of the exposed portion 10 and the remote area 22. The covered portions 20 may not have the adjacent areas 21 in which the density of the conductive material per unit length is locally lowered, necessarily. The exposed portion 10 may be directly adjacent with a portion where the density of the conductor material per unit length is not changed from the state before the water-stopped portion 4 is formed. In other words, it is enough that the density of the conductor material per unit length is higher in the exposed portion 10 at least than in the remote areas 22 locating away from the exposed portion 10.

FIG. 1 schematically illustrates a state of the conductor 2 having the density distribution of the conductive material as described above. In FIG. 1, the area inside the conductor 2 is hatched. The higher the density of hatching is, the smaller the twist pitch of the elemental wires 2a is, that is, the smaller the spacing between the elemental wires 2a is. Further, the larger the width (vertical length) of the area representing the conductor 2 is, the larger the diameter of the conductor 2 is. Those parameters in the drawings are only schematically showing the relation of the size between the areas and are not proportional to the twist pitch of the elemental wires 2a or the diameter of the conductor. Furthermore, the parameters in the drawings are discontinuous between the areas, but in the actual insulated electric wire 1, the state of the conductor 2 changes between the areas continuously.

As shown in FIG. 1 and FIG. 3, the conductor 2 has a larger diameter in the exposed portion 10 than in the remote areas 22 of the covered portions 20. Thus, the elemental wires 2a constituting the conductor 2 in the exposed portion 10 are bent and mutually fixed by the sealant 5 in the bent state. Due to the bending of the elemental wires 2a, the density of the conductive material per unit length is higher in the exposed portion 10 than in the remote areas 22. That is, a mass of the conductive material contained per unit length of the conductor 2 is increased.

Since the density of the conductive material per unit length is higher in the exposed portion 10 than in the remote area 22 of the covered portion 20, sufficient gaps are ensured between the elemental wires 2a when the elemental wires 2a are bent while the diameter of the conductor 2 is enlarged, and the sealant 5 is more likely to permeate into the gaps between the elemental wires 2a, and thus the sealant 5 can fill easily and evenly each area of the exposed portion 10 with high uniformity. Accordingly, a highly reliable water stopping can be performed in the areas between the elemental wires 2a of the exposed portion 10. From the viewpoint of sufficiently obtaining an effect of the water-stopping performance, the density of the conductive material per unit length in the exposed portion 10 is preferably 1.01 times or larger (101% or larger), more preferably 1.2 times or larger (120% or larger) of the density of the conductive material per unit length in the remote area 22.

On the other hand, if the density of the conductive material per unit length in the exposed portion 10 is excessively high, a load may be applied to the conductor 2 in the exposed portion 10 and the covered portion 20, or the spacing between the elemental wires 2a may be too large to keep the sealant 5 in the gaps between the elemental wires 2a. Thus, the density of the conductive material per unit length in the exposed portion 10 is preferably 1.5 times or smaller (150% or smaller) of the density of the conductive material per unit length in the remote area 22.

Furthermore, it is preferable that the twist pitch of the elemental wires 2a is smaller in the exposed portion 10 than in the remote area 22 of the covered portion 20. This is because when the twist pitch of the elemental wires 2a is smaller in the exposed portion 10, the spacing between the elemental wires 2a of the exposed portion 10 becomes small, which leads to improvement of the water-stopping performance. That is, if the spacing between the elemental wires 2a is reduced when the gaps between the elemental wires 2a are filled with the sealant 5 in a state of keeping high fluidity during formation of the water-stopped portion 4, the sealant 5 is effectively kept in the spacing between the elemental wires 2a uniformly without dropping or flowing. If the fluidity of the sealant 5 is lowered by curing of the curable resin or the like while keeping the sealant 5 in the gap, a high water-stopping performance can be obtained at the exposed portion 10.

(Production Method for Water-Stopped Portion)

To produce the water-stopped portion 4 in the insulated electric wire 1, the exposed portion 10 is formed in a middle part of the insulated electric wire 1 by removing the insulation covering 3 and exposing the conductor 2. In the exposed portion 10, a density of the conductive material per unit length is lower in the remote area 22 of the covered portion 20, while spacing between the elemental wires 22 is larger than in the remote area 22. The conductor 2 including the areas having different densities of the conductive material per unit length can be produced through processing of a conventional insulated electric wire having a uniform conductor density along the entire length of the wire. For instance, the insulation covering 3 is first partly removed at a position where the exposed portion 10 is to be formed. Then, a force is applied to the conductor 2 to increase spacing between the elemental wires 2a in the area to be the exposed portion 10 while bending the elemental wires 2a in the area to be the coated portions 20 by feeding out the elemental wires 2a from the area to be the coated portions 20. Alternatively, the conductor 2 including the areas having different densities of the conductive material per unit length can be produced through modification of twisting of the elemental wires 2a, for example, during formation of the conductor 2 by twisting the elemental wires 2a together, so that the conductor 2 will be formed to have a specific distribution of the density of the conductive material per unit length.

The exposed portion 10 having a higher density of the conductive material per unit length is thus formed adjacent to the covered portion 20. Then, the gaps between the elemental wires 2a are filled with the sealant 5 at the exposed portion 10. It is preferable that the sealant 5 permeates into the gap between the elemental wires 2a with keeping fluidity. The filling operation using the sealant 5 may be performed through introduction of a resin composition with fluidity into the gaps between the elemental wires 2a using an appropriate method such as dripping, coating, and injection according to the property of the sealant 5 such as viscosity.

It is preferable that the sealant 5 fills the gap between the elemental wires 2a and be further disposed on the outer surface of the conductor 2 of the exposed portion 10. To this end, for instance, sufficient amount of the sealant 5 is introduced to the exposed portion 10 to fill the gap between the elemental wires 2a, and further to leave extra sealant 5. The sealant 5 may be introduced to preferably from multiple directions along circumference along the exposed portion 10. In this case, it is preferable that the sealant 5 is provided to the outer peripheral portion of the insulation covering 3 at the end portions of the covered portions 20 in addition to the outer surface of the exposed portion 10. The sealant 5 may be easily provided to the outer surface of the insulation covering 3 at the end portions of the covered portions 20 through moving of the insulation coverings 3 in the covered portions 20 located on the both sides of the exposed portion 10 toward the exposed portion 10 before the sealant 5 fully lowers fluidity after arranged at the outer surface of the covered portion 10. Further, the spacing between the elemental wires 2a may be reduced while the sealant 5 keeps high fluidity to maintain the sealant 5 easily between the elemental wires 2a.

In the insulated electric wire 1 according to the present embodiment, the density of the conductive material per unit length in the exposed portion 10 is higher increased, and thus the spacing between the elemental wires 2a is increased. The sealant 5 is introduced into the space-increased areas between the elemental wires 2a, and thus, the sealant 5 can easily permeate between the elemental wires 2a. Accordingly, the sealant 5 can easily permeate every part of the exposed portion 10 with high uniformity without unevenness. Consequently, after curing of the sealant 5, the water-stopped portion 4 having an excellent water-stopping performance and high reliability can be formed. Further, uniform permeation of the sealant 5 can be achieved easily without application of any special method such as use of a pressure chamber as described in Patent Document 1.

Further, as described above, even where the sealant 5 has high viscosity upon filling, such as of 4000 mPa·s or higher, and has low fluidity, the sealant 5 can permeate the gap between the elemental wires 2a with high uniformity because spacing between the elemental wires 2a is increased. Since the high viscous sealant 5 can be used, the type of the usable sealant 5 is increased. When the sealant 5 is introduced not only in the gap between the elemental wires 2a but also on the outer surface of the conductor 2 of the exposed portion 10 and the outer surface of the end portions of the covered portions 20, the sealant 5 can stay easily on the outer peripheral portion of the conductor 2 without causing flowing, dripping and the like due to high viscosity. Consequently, the sealant 5 is also provided easily in the outer peripheral portion of the conductor 2 with high uniformity.

[Insulated Electric Wire According to Second Embodiment]

Next, an insulated electric wire according to the second embodiment of the present invention will be described below. The explanation about the common configurations to the ones of the first embodiment will be omitted and different configurations will be described below in detail.

An insulated electric wire 1' (not shown in figures) according to the second embodiment of the present invention contains a conductor 2 and an insulation covering 3 covering the conductor 2. The conductor 2 contains a plurality of elemental wires 2a made of a conductive material. The plurality of elemental wires 2a are twisted together. A water-stopped portion 4 is formed in the middle portion of the insulated electric wire 1 in the longitudinal axis of the wire 1. The water-stopped portion 4 involves an exposed portion 10 at which the insulation covering 3 is removed from the outer surface of the conductor 2. In the exposed portion 10, the sealant 5 fills the gaps between the elemental wires 2a constituting the conductor 2.

The sealant 5 continuously covers the outer surface of the conductor 2 in the exposed portion 10 with the gaps between the elemental wires 2a in the exposed portion 10. It is preferable that the sealant 5 covers the entire outer surface the exposed portion 10.

Further, it is preferable that the sealant further continuously covers the outer surfaces of the insulation covering 3 at end portions of the covered portions 20 adjacent with the exposed portion 10, with an area of the outer surface of the conductor 3 covered by the sealant in the exposed portion 10, that is the outer surface of an end portion of an area of the insulation covering 3 wherein the insulation covering 3 stays on the outer surface of the conductor 2. In this case, the sealant 5 covers the outer surface, preferably the entire outer surface of an area extending from the end portion of the covered portion 20 located on one side of the exposed portion 10 to the end portion of the covered portion 20 located on the other side of the exposed portion 10 continuously. Further, the sealant 5 fills the areas between the elemental wires 2a of the exposed portion 10 continuously with covering the outer surfaces portion.

In the insulated electric wire 1' according to the second embodiment of the present invention, in addition to being placed in the gap between the elemental wires 2a of the exposed portion 2, the common sealant 5 is provided to the outer surface of the exposed portion 10, preferably further to the outer surface of the end portions of the covered portions 20 adjacent to the exposed portion 10 continuously, as described above.

In the insulated electric wire 1' according to the present embodiment, water stopping is achieved between the elemental wires 2a constituting the conductor 2 in the exposed portion 10 by filling the sealant 5 into the gaps between the elemental wires 2a. Further, physical protection of the outer surface of the water-stopped portion 4, and water stopping between the conductor 2 and the insulation covering 3 are achieved by the sealant 5 covering the outer surface of the exposed portion 10, and preferably covering the outer surface of the end portions of the covered portions 20 adjacent to the exposed portion 10 without a protective member such as a shrinkable tube as a separate member. Accordingly, in the insulated electric wire 1', the water-stopped portion 4 may be formed to have a simple configuration, and increase of the diameter of the insulated electric wire 1' caused by the protective material, and increase of the entire diameter of a wiring harness containing the insulated electric wire 1' can be prevented. The insulated electric wire 1' having the water-stopped portion 4 can be formed through simple processes without placing a protective material as a separate member.

It is preferable that the sealant 5 has a high viscosity, from the viewpoint of placing the sealant 5 onto the exposed portion 10 and onto the outer surfaces of the end portions of the covered portions 20 without following or dropping. For instance it is preferable that a curable resin composition having a viscosity of 4000 mPa·s or higher, more preferably 5,000 mPa·s or higher, still more preferably 10,000 b mPa·s or higher upon filling.

When the sealant 5 has high viscosity, difficulty may arise in filling the gap between the elemental wires 2a with the sealant 5 in the exposed portion 10. For example, by increasing the gap between the elemental wires 2a in the exposed portion 10, the sealant 5 easily permeates between the elemental wires 2a. Alternatively, permeation of the sealant 5 may be performed by using pressure difference or gas flow as described in Patent Document 1. However, if the sealant 5 has an excessively high viscosity, it will be difficult to fill the gap between the elemental wires 2a with the sealant 5 even by those methods. Thus, the viscosity of the sealant 5 is preferably 200,000 mPa·s or lower upon filling.

EXAMPLES

A description of the present invention will now be specifically provided with reference to examples. Here, relation between the configuration of the water-stopped portion of the insulated electric wire and the water-stopping performance was examined. However, the present invention is not limited to the examples.

(Test Method)
(1) Preparation of Samples

An insulated electric wire was prepared by covering the outer surface of a copper stranded conductor having a conductor cross-sectional area of 0.5 mm$^2$ (diameter of elemental wire: 0.18 mm; number of elemental wires: 20) with an insulation covering having a thickness of 0.35 mm made of a polyvinylchloride. Then, an exposed portion having a length of 8 mm was formed at a middle portion of the insulated electric wire. Then, water-stopping treatment was applied to the exposed portion to form a water-stopped portion.

Electric wire samples were prepared each one of three types of exposed portions having different densities of the conductive material per unit length (i.e., portions A, B, and C). When the density of the conductive material per unit length of the remote area of the covered portion was defined as 100, the density of the conductive material per unit length (relative density of the exposed portion) was 130 (average value) in A, and 101 in B. The relative density of the exposed portion was defined by measuring the mass for conductors having the same length cut from the exposed portion A, or the exposed portion B, and the covered portion, respectively, and calculating the ratio thereof based on the measured values. For the exposed portion C, only removal of the insulation covering from the insulated wire was performed, and thus, the relative density of the exposed portion was 100.

The following two types of sealants were used:
High-viscosity sealant: A moisture-curable silicone resin having a viscosity of 5000 mPa·s (at 23° C.), "KE-4895" manufactured by Shin-Etsu Chemical Co., Ltd.;
Low-viscosity sealant: A moisture-cure acrylic resin having a viscosity of 2 mPa·s (at 23° C.), "7781" manufactured by ThreeBond Co., Ltd.

The structure of the water-stopped portion of each sample is as follows:
Sample 1: Water stopping treatment was performed using the high-viscosity sealant for the electric wire sample having the exposed portion A. A layer of the sealant was formed on the outer peripheries (outer peripheral areas) of the exposed portion and the end portions of the covered portions adjacent to the exposed portion.
Sample 2: Water stopping treatment was performed using the low-viscosity sealant for the electric wire sample having the exposed portion A. A layer of the sealant was not formed in the outer peripheral areas.

Sample 3: A shrinkable tube with an adhesion layer was additionally provided to the outer surface of the water-stopped portion of Sample 2.

Sample 4: Water stopping treatment was performed using the low-viscosity sealant for the electric-wire sample having the exposed portion B. A layer of the sealant was not formed in the outer peripheral areas.

Sample 5: Water stopping treatment was performed using the low-viscosity sealant for the electric-wire sample having the exposed portion C. A layer of the sealant was not formed in the outer peripheral areas.

(2) Evaluation of the Water-Stopping Performance

For the water-stopped portion of each example, a leak test was performed to evaluate the water-stopping performance between the elemental wires, and between the conductor and the insulation covering. Specifically, the water-stopped portion of each insulated electric wire was immersed in water and an air pressure of 150 kPa or 200 kPa was applied from one end of the wire. Then, the water-stopped portion, and the other end of the insulated electric wire to which no air pressure was applied were visually observed.

Upon application of the air pressure of 150 kPa or 200 kPa, if bubbles were not generated either between the elemental wires of the water-stopped portion in the middle portion of the water-stopped portion, or at the end of the insulated electric wire from which air pressure was not applied, the water-stopping performance between the elemental wires was evaluated as "Excellent". Upon application of the air pressure of 150 kPa, if bubbles were not generated at either portion, the water-stopping performance between the elemental wires was evaluated as "Good". Upon application of the air pressure of 150 kPa, if bubbles were generated at at least one of the aforementioned portions, the water-stopping performance of the elemental wires was evaluated as "Poor".

Further, upon application of the air pressure of 150 kPa or 200 kPa, if bubbles were not generated between the conductor and the insulation covering in the end portions of the water-stopped portion, the water-stopping performance between the conductor and the insulation covering was evaluated as "Excellent". Upon application of the air pressure of 150 kPa, if no bubbles were not generated at either portion, the water-stopping performance between the conductor and the insulation covering was evaluated as "Good". Upon application of the air pressure of 150 kPa, if bubbles were generated at at least one of the aforementioned portions, the water-stopping performance between the conductor and the insulation covering was evaluated as "Poor".

(Results)

Table 1 indicates the results of the water-stopping test along with the summary of the structure of the water-stopped portions.

TABLE 1

| | | Sample 1 | Sample 2 | Sample 3 | Sample 4 | Sample 5 |
|---|---|---|---|---|---|---|
| Structure of Water-Stopped Portion | Type of Water-Stopped Portion | Exposed Portion A | Exposed Portion A | Exposed Portion A | Exposed Portion B | Exposed Portion C |
| | Relative Density of Water-Stopped Portion | | 130 | | 101 | 100 |
| | Sealant | High Viscosity | Low Viscosity | Low Viscosity | Low Viscosity | Low Viscosity |
| | Layer of Sealant in Outer Peripheral Areas | Formed | Not Formed | Not Formed | Not Formed | Not Formed |
| | Use of Shrinkable Tube | Not Used | Not Used | Used | Not Used | Not Used |
| Water-Stopping Performance | Between Elemental Wires | Excellent | Excellent | Excellent | Good | Poor |
| | Between Conductor and Insulation Covering | Excellent | Poor | Excellent | Poor | Poor |

As shown in Table 1, in Samples 1 to 4 a high water-stopping performance was achieved at least between the elemental wires. It can be deduced that the sealant sufficiently permeated the increased gaps between the elemental wires in the exposed portion having increased spacing therebetween because the water-stopped portion was formed for the exposed portion having the higher density than the remote areas of the coated portions. Among them, Sample 1 to Sample 3 each having a higher relative density of the exposed portion achieved an excellent water-stopping performance between the elemental wires.

In Sample 1, in which formed a layer in the outer peripheral areas in addition to filling the gaps between the elemental wires, a water-stopping performance was excellent between the conductor and the insulation covering as well as between the elemental wires. It was presumably because the sealant had high viscosity, and thus it stayed stably on the outer surface of the conductor of the exposed portion and the outer surface of the insulation covering of the coated portions on the both sides of the exposed portion in the uncured state. Meanwhile, in Sample 2 and Sample 4, in which a low viscosity sealant was used, sufficient water-stopping performance was achieved between the elemental wires, while sufficient water-stopping performance was not achieved between the conductor and the insulation covering. This is because the sealant did not stably remain at the outer peripheral areas in the uncured state. As in Sample 3, a sufficient water-stopping performance was achieved between the conductor and the insulation covering by additional use of a shrinkable tube.

In sample 5, a sufficient water-stopping performance was not achieved either between the elemental wires or between the conductor and the insulation covering. It was presumably because the spacing between the elemental wires was not increased, and thus, the sealant did not permeate the spacing between the elemental wires with high uniformity, and further because a low viscosity sealant was used, the sealant was not stably placed at the outer peripheral areas.

The embodiments of the present invention have been described specifically but the present invention is no way restricted to the embodiments described above but can be modified variously within a range not departing from the gist of the present invention.

EXPLANATION OF REFERENCES

1 Insulated electric wire
2 Conductor
2a Elemental wire
3 Insulation covering
4 Water-stopped portion
5 Sealant
10 Exposed portion
20 Covered portion
21 Adjacent area
22 Remote area

The invention claimed is:

1. An insulated electric wire comprising:
a conductor comprising a plurality of twisted elemental wires made of a conductive material;
an insulation covering that covers an outer surface of the conductor;
an exposed portion in which the insulation covering is removed from the outer surface of the conductor; and
a covered portion in which the insulation covering covers the outer surface of the conductor,
wherein the exposed portion and the covered portion are placed adjacent with each other along a longitudinal axis of the insulated electric wire,
a density of the conductive material per unit length is higher in the exposed portion at least than in a remote area of the covered portion that is an area excluding an area adjacent to the exposed portion of the covered portion,
gaps between the elemental wires of the exposed portion are filled with a sealant made of an insulated material, and
the elemental wires have a smaller twist pitch in the exposed portion than in the remote area.

2. The insulated electric wire according to claim 1, wherein in the exposed portion, the sealant further covers the outer surface of the conductor, and the portion of the sealant covering the outer surface of the conductor and the portion of the sealant filling the gaps between the elemental wires are continuous.

3. The insulated electric wire according to claim 2, wherein the sealant further covers the outer surface of the insulation covering at an end portion of the covered portion adjacent with the exposed portion, and the portion of the sealant covering the outer surface of the insulation covering at the end portion of the covered portion adjacent with the exposed portion, and the portion of the sealant covering the outer surface of the conductor in the exposed portion are continuous.

4. The insulated electric wire according to claim 1, wherein the density of the conductive material per unit length in the exposed portion is 1.01 times of the density of the conductive material per unit length in the remote area or higher.

5. The insulated electric wire according to claim 1, wherein the density of the conductive material per unit length in the exposed portion is 1.50 times of the density of the conductive material per unit length in the remote area or lower.

6. The insulated electric wire according to claim 1, wherein the exposed portion is placed at a middle portion along the longitudinal axis of the insulated electric wire, and the density of the conductive material per unit length is higher in the exposed portion than in the remote areas of the covered portion that is an area except an area adjacent to the exposed portion of the covered portion.

7. The insulated electric wire according to claim 1 further comprising a protective member placed on an outer surface of the sealant as a separate member from the sealant.

8. The insulated electric wire according to claim 1, wherein the insulated electric wire does not comprise a protective member on an outer surface of the sealant as a separate member from the sealant.

9. The insulated electric wire according to claim 1, wherein all of the elemental wires constituting the conductor are collectively twisted all together at least in the remote area.

10. The insulated electric wire according to claim 1, wherein the conductor has a cross section of 8 $mm^2$ or smaller.

11. The insulated electric wire according to claim 1, wherein the elemental wires have a diameter of 0.45 mm or smaller.

12. The insulated electric wire according to claim 1, wherein the sealant comprises a resin composition exhibiting at least one or more types of curability selected from the group consisting of thermal curability, photocurability, moisture curability, and two-component reaction curability.

13. The insulated electric wire according to claim 1, wherein the sealant comprises one or more resin compositions selected from the group consisting of silicone resins, acrylic resins, epoxy resins, and urethane resins.

14. The insulated electric wire according to claim 1, wherein the sealant comprises a resin composition having a viscosity of 4000 mPa·s or higher.

15. The insulated electric wire according to claim 1, wherein the sealant comprises a resin composition having a viscosity of 200,000 mPa·s or lower.

16. The insulated electric wire according to claim 1, wherein, in the covered portion, the insulated electric wire further comprises an adjacent area located adjacent to the exposed portion, the adjacent area having a lower density of the conductive material per unit length than the exposed portion and the remote area.

* * * * *